US012579851B2

(12) United States Patent
Gutlein et al.

(10) Patent No.: US 12,579,851 B2
(45) Date of Patent: Mar. 17, 2026

(54) METHOD AND DIAGNOSTIC DEVICE FOR PERFORMING VEHICLE DIAGNOSTICS

(71) Applicant: HELLA GUTMANN SOLUTIONS GMBH, Ihringen (DE)

(72) Inventors: Martin Gutlein, Ihringen (DE); Uwe Riegger, Ihringen (DE)

(73) Assignee: HELLA GUTMANN SOLUTIONS GMBH, Ihringen (DE)

( * ) Notice: Subject to any disclaimer, the term of this patent is extended or adjusted under 35 U.S.C. 154(b) by 534 days.

(21) Appl. No.: 17/998,101

(22) PCT Filed: May 4, 2021

(86) PCT No.: PCT/EP2021/061617
§ 371 (c)(1),
(2) Date: Apr. 20, 2023

(87) PCT Pub. No.: WO2021/224202
PCT Pub. Date: Nov. 11, 2021

(65) Prior Publication Data

US 2023/0252829 A1 Aug. 10, 2023

(30) Foreign Application Priority Data

May 7, 2020 (EP) .................................... 20173583

(51) Int. Cl.
*G07C 5/08* (2006.01)
*G07C 5/00* (2006.01)

(52) U.S. Cl.
CPC ........... *G07C 5/0808* (2013.01); *G07C 5/008* (2013.01); *G07C 2205/02* (2013.01)

(58) Field of Classification Search
CPC ... G07C 5/0808; G07C 5/008; G07C 2205/02
See application file for complete search history.

(56) References Cited

U.S. PATENT DOCUMENTS

2010/0324376 A1* 12/2010 Chinnadurai .......... G16H 50/20 702/183
2014/0324275 A1 10/2014 Stanek et al.
(Continued)

FOREIGN PATENT DOCUMENTS

EP 2133243 A1 * 12/2009 ............. G07C 5/085
WO WO-2018234832 A1 12/2018

OTHER PUBLICATIONS

"International Application Serial No. PCT/EP2021/061617, International Search Report dated Jul. 26, 2021", w/ English Translation, (Jul. 26, 2021), 7 pgs.
(Continued)

*Primary Examiner* — Brandon D Lee
(74) *Attorney, Agent, or Firm* — Schwegman Lundberg & Woessner, P.A.

(57) ABSTRACT

The invention relates to a method for performing vehicle diagnostics, comprising the steps of:

receiving (S14, S24) a plurality of fault codes from a vehicle (10),
determining at least one first vehicle fault state, the vehicle fault state constituting a state of the vehicle (10) in which at least one of the fault codes has been triggered in the vehicle (10), on the basis of the relevant fault code and historical vehicle data from a database,
determining relevant sensor measurement variables to be measured on the basis of the fault codes,
requesting that at least the first vehicle fault state be induced,
receiving (S16, S26) the measured sensor measurement variables from the vehicle (10),
determining at least one potentially defective component.

The invention also relates to a diagnostic device for carrying out the method.

21 Claims, 3 Drawing Sheets

(56) References Cited

U.S. PATENT DOCUMENTS

| | | | | |
|---|---|---|---|---|
| 2017/0039785 | A1* | 2/2017 | Richter | G07C 5/008 |
| 2021/0049836 | A1* | 2/2021 | Covington | G07C 5/085 |

OTHER PUBLICATIONS

"International Application Serial No. PCT/EP2021/061617, Written Opinion dated Jul. 26, 2021", (Jul. 26, 2021), 6 pgs.

* cited by examiner

METHOD AND DIAGNOSTIC DEVICE FOR PERFORMING VEHICLE DIAGNOSTICS

PRIORITY APPLICATIONS

This application is a U.S. National Stage Filing under 35 U.S.C. § 371 from International Application No. PCT/EP2021/061617, filed on May 4, 2021, and published as WO2021/224202 on Nov. 11, 2021, which claims the benefit of priority to European Application No. 20173583.4, filed on May 7, 2020; the benefit of priority of each of which is hereby claimed herein, and which applications and publication are hereby incorporated herein by reference in their entireties.

The present invention relates to a method and to a diagnostic device for performing vehicle diagnostics, wherein the cause of the fault in the vehicle is automatically determined.

The increasing interconnectedness of controllers in modern-day motor vehicles provides constantly improving options for influencing functions in the vehicle, for example improved diagnostic options in the event of a fault or options for remotely controlling functions and/or components of the vehicle. In a vehicle, for example a car, a two-wheeled vehicle, or a truck, fault messages from controllers and sensors can be reported via what is known as an on-board diagnostic function.

Modern vehicles are complex electrical and mechanical systems which use many components that communicate with one another in order to support reliable and efficient vehicle operation. Such components can be susceptible to faults, failures and errors that can affect the operation of a vehicle. When such faults or errors occur, the affected component may trigger a corresponding error code, for example a Diagnostic Trouble Code (DTC). The fault code is generally stored in a vehicle-side memory. After this, a warning signal can be output, for example, which prompts the driver to find a garage.

By evaluating the fault codes (vehicle diagnostics), a conclusion can be drawn as to which vehicle components are defective and need repairing. To do this, a vehicle diagnostic interface is usually provided in the vehicle, which is often arranged in the driver's footwell, Typically, an external vehicle diagnostic tool is connected to the vehicle diagnostic interface in order to read out the stored fault codes. After this, the error codes are analysed by the vehicle diagnostic device in order to diagnose which components need to be repaired or replaced to correct the problem. Such vehicle diagnostic devices have proven their worth in everyday workshop use.

However, although the vehicle diagnostic tool can usually read out the fault codes, it cannot access all the further relevant information that is stored in the vehicle. Furthermore, the fault codes differ by the manufacturer, vehicle type, and year of vehicle manufacture, inter alia. Although the type and meaning of the fault code are often known to the vehicle manufacturer (OEM), they are not generally part of manufacturer's specifications/notices and therefore are not known to the company handling the vehicle diagnostics.

With known fault codes, it is also often laborious to find the actual cause of the fault message. If, for example, an increased coolant temperature is reported as a fault, there may be many causes of the fault, for example a lack of cooling liquid owing to a leak in the cooling system, inadequate liquid throughput owing to steam bubbles or a defective coolant pump, or overheating owing to the vehicle previously having a heavy load and climatic conditions.

One option for determining the cause of the fault is, for example, calling a call centre, where fault trees are stored, which are processed using questions. This can take up a lot of manpower and time, however.

Currently, many separate work steps are required to be able to perform complete diagnostics. First, a vehicle has to be selected on the diagnostic tool. Usually, fault codes then have to be read out and parameters then measured. On the basis of this information, the mechanic looks for the corresponding vehicle information that they need for the repair. The displayed diagnostic results are sometimes difficult to interpret and imprecise in part, however.

Owing to the increasing complexity of vehicle technology, there is therefore a great need to rapidly and reliably determine the causes of faults when a fault occurs in a vehicle. In particular, it would be desirable to find a practical solution for determining the causes of faults.

According to the invention described, the above-mentioned problems are solved, at least partly or in large part, by a method corresponding to the main claim and by a device according to the independent claim. Advantageous features and developments result from the features of the dependent claims and from the following description.

Accordingly, a method for performing vehicle diagnostics is provided. The method comprises at least the steps of:

- receiving a plurality of fault codes from a vehicle,
- determining at least one first vehicle fault state, the vehicle fault state constituting a state of the vehicle in which at least one of the fault codes has been triggered in the vehicle, on the basis of the relevant fault code and historical vehicle data from a database,
- determining relevant sensor measurement variables to be measured on the basis of the fault codes,
- requesting that at least the first vehicle fault state be induced,
- receiving the measured sensor measurement variables from the vehicle,
- determining at least one potentially defective component.

The method is therefore used to determine the vehicle fault state in which the fault code was triggered. Because the vehicle fault state is then induced, the exact cause of the fault message can be determined on the basis of the fault code by evaluating the sensor measurement variables from the vehicle that is in the vehicle fault state. Overall, by means of the proposed method, the vehicle diagnostics can be simplified and accelerated. Inter alia, the method is characterised in that the steps are carried out automatically, in particular by a control unit such as a processor or controller. As a result, the effort required of an automotive mechanic can be considerably reduced.

For example, the fault code may include a diagnostic fault code, known as a diagnostic trouble code (DTC), which is generated by a controller of the vehicle by means of sensors of the vehicle. By way of example, a diagnostic fault code of this kind can be provided by a vehicle diagnostic system, known as on-board diagnostics (OBD), during operation of the vehicle if a fault state is present.

According to the present document, historical data relate to data which have been determined or measured and stored in the database in the past. Vehicle data from the vehicle can therefore be compared with the historical vehicle data, in particular also from vehicles from other vehicle manufacturers, in order to be able to draw a conclusion as to the vehicle state or the vehicle fault state. The historical vehicle data preferably include the vehicle identification means, vehicle manufacturer, vehicle type, vehicle equipment, fault codes, mileage, vehicle age, sensor measurement values, and/or sensor measurement variables. Said vehicle data are preferably combined in at least one matrix and in particular assigned to a particular vehicle or vehicle group.

The database can be part of a memory medium, a server, and/or a diagnostic tool. The database is in particular not part of the vehicle and can be referred to as an external database.

In one variant of the method, the request for the first vehicle fault state to be induced contains at least one of the following instructions or requests:

changing, activating, or setting at least one final control element, changing or setting at least one vehicle parameter, switching at least one vehicle module on or off.

Vehicle functions can also be activated, for example the regeneration of diesel particulate filters. The instructions or requests are preferably followed by a user, such as an automotive mechanic, and are performed on the vehicle. In some circumstances, the request is sent to the vehicle itself and is then implemented by the vehicle, After the request is received, the at least one final control element, vehicle module, and/or vehicle controller are accordingly changed, set, or switched on or off, or the at least one vehicle parameter is accordingly changed. From feedback from the vehicle or a user, it can be identified that the first vehicle fault state has been induced. The method can thus contain the step of: receiving confirmation that the vehicle is in the first vehicle fault state.

The method can comprise the additional step of: determining a relevance of the fault code in question.

The relevance of the fault code in question can optionally be determined on the basis of an average time interval between triggering and deleting identical historical fault codes. The fault is generally deleted manually at the garage by the mechanic once they have repaired the vehicle or resolved the fault. The average time interval can be stored in said database, for example, and can be based on empirical values or recorded data, by way of example. If a fault code remains active for a long time on average before the fault is deleted, this can be an indication that operation of the vehicle is not significantly disrupted by the fault and this is not a serious fault. If, conversely, the time interval between the fault being triggered and the fault being deleted is short on average, this can be an indication that undisrupted operation of the vehicle is only ensured by rapidly resolving the fault, is only possible to a limited extent owing to the fault that has occurred, or is even completely impossible in some circumstances. It can thus be provided that the relevance is comparatively high when the average time interval falls below a predetermined value. The relevance can be comparatively low when the average time interval exceeds a predetermined value.

Alternatively or additionally, the fault codes can be classified by vehicle assembly and/or customer group and/or correlating historical fault codes by comparison with historical fault codes from the database. In this case, correlating fault codes can be fault codes that occur more frequently on average when the fault code occurs. When the fault code is assigned to a particular vehicle assembly, the correlating fault codes can likewise be assigned to this vehicle assembly. The relevance of the fault code in question can then be determined on the basis of the classification of the fault code.

In a further step, the fault codes can be sorted and/or evaluated by relevance. Here, the relevance can be expressed by a number, e.g. either 0 (not relevant) or 1 (relevant), or a number between 0 and 1. The first vehicle fault state, the relevant sensor measurement variables to be measured, and/or the at least one potentially defective component can be determined on the basis of the relevance of the fault codes.

By connecting a diagnostic tool to a diagnostic interface provided in the vehicle, the diagnostic tool can obtain information regarding the current state of the vehicle and the faults that are present. Furthermore, a user interface, such as a display comprising a user environment, is generally provided in the diagnostic tool, by means of which user interface additional information can be requested or input by the user.

Historical logging data from diagnostic tools, which data can in particular be stored in the database, can additionally be taken into consideration for determining the at least one potentially defective component. "Logging" is usually referred to as creating a record of a diagnostic process, this being created automatically, as a rule. The historical logging data preferably include retrieved repair information and/or retrieved vehicle component information which have been retrieved during earlier (historical) vehicle diagnostics, for example. Therefore, if the mechanic is often or always retrieving particular repair information and/or vehicle component information after reading out/receiving a particular fault code, this is an indication that a particular component is defective when this particular fault code occurs. Taking the historical logging data into consideration when determining the potentially defective component can thus considerably accelerate the automatic vehicle diagnostics.

A target range can be determined by comparison with historical vehicle data for each sensor measurement variable. In this case, the target range preferably includes a target measurement value and/or a tolerance range for the target measurement value. Measurement values within the target range are accordingly evaluated as being positive, while measurement values outside the target range are evaluated as being negative. In general, the target range depends on a plurality of internal vehicle parameters (e.g. vehicle age, mileage) or external vehicle parameters (e.g. outdoor temperature), which can likewise be stored in the database. Furthermore, correlating sensor measurement variables and/or coherent sensor measurement variables can be taken into consideration for determining the target range. Coherent sensor measurement variables can be assigned to the same vehicle assembly (such as the engine, air-conditioning system, brake system, infotainment system, etc.), for example.

The method can also comprise at least one of the following steps:

comparing the measured sensor measurement variables with the respective target ranges for identifying outliers in the sensor measurement variables and displaying the comparison on a user interface.

The user interface can in particular be a display or the above-mentioned user interface on the vehicle diagnostic tool.

The method can contain at least one of the following steps:

receiving at least one vehicle identification means, the vehicle identification means in particular including a vehicle identification number and/or an engine code and/or a controller identification number and/or a code designation, comparing the vehicle identification means with known vehicle identification means from the database, and identifying the vehicle to be diagnosed on the basis of the comparison, preferably in a cross-vehicle-manufacturer manner and independently of the vehicle manufacturer.

For example, the vehicle identification means indicates the vehicle manufacturer and/or a vehicle type of the vehicle and, furthermore, optionally indicates equipment features of the vehicle, such as the engine variant or fuel injection system. The vehicle identification means can, for example, include a vehicle-specific number, such as a vehicle identification number (VIN), using which a vehicle can be uniquely identifiable. By means of the vehicle identification means, information on the vehicle or comparable vehicles can be determined from the database in a simple manner. It has been found that the VIN is not always sufficient to uniquely establish the identity of the vehicle. In this case, at least one further vehicle identification means can be used, for example an engine code and/or a controller identification number and/or a code designation of the vehicle. The code designation of the vehicle can be stored in a controller of the vehicle and can provide information regarding the manufacturer, type, and/or equipment of the vehicle.

By combining at least two vehicle identification means, the identity of the vehicle can be concluded and the vehicle (manufacturer, type, and/or equipment) can be identified. Alternatively, the identity of the vehicle can be established by identifying a pattern in the vehicle identification means and by comparing it with identical or similar patterns in the database.

The step of receiving the vehicle identification means can e.g. involve the vehicle identification means being transmitted by the vehicle or being input by a user. The vehicle identification means can be transmitted or input following a request where necessary.

In a further configuration, the method can comprise the following step: determining context-based repair information on the basis of the fault codes and/or the sensor measurement variables and/or the potentially defective components. Context-based repair information for example includes circuit diagrams, operate values, or component test values which the user needs for repairing the vehicle or resolving the fault. The context-based repair information can be determined by comparison with the historical logging data.

According to a development, the at least one potentially defective component is additionally determined on the basis of service data and/or billing data at garages and/or on the basis of accessing repair information in the database.

Optionally, the fault codes are evaluated on the basis of the measured sensor measurement variables. By means of this evaluation, the at least one potentially defective component can be determined. The at least one potentially defective component can then be determined on the basis of the fault codes and the measured sensor measurement variables.

Optionally, the method comprises at least one, a plurality of, or all the following steps:

- creating and/or displaying a list of potentially defective components,
- creating and/or displaying context-based component information,
- creating and/or displaying required repair steps.

In a further step, the diagnostic results can be displayed on the display device, the display device preferably being part of a diagnostic tool or the above-mentioned user interface.

The above-described automatic method can accelerate and simplify the operation of the diagnostic tool. In particular, comprehensive knowledge of the diagnostic tool is no longer required. The user no longer has to navigate through about 10 or more interfaces/menus with about 75 “clicks”. Using the proposed method, comprehensive knowledge of cars is no longer required, either, in order to interpret the combination of the displayed fault codes and the read-out sensor measurement values (e.g. engine speed in connection with injected fuel quantity and accelerator position). The automatic, data-driven identification of potentially affected components (on the basis of fault codes and sensor measurement values or parameter values) is more accurate than the previous approach of listing possibly affected components by separate fault code.

The above-mentioned method can in particular be carried out by a vehicle diagnostic tool, a server, and/or a system comprising a vehicle diagnostic tool and a server. The vehicle diagnostic tool, the server, or the system can preferably be connected to the vehicle, for example directly or indirectly, via a vehicle diagnostic interface for communicating with the vehicle.

Furthermore, the invention provides a diagnostic device which is directed to carrying out the above method. The diagnostic device is designed to carry out at least the following steps:

- receiving a plurality of fault codes from a vehicle,
- determining at least one first vehicle fault state, the vehicle fault state constituting a state of the vehicle in which at least one of the fault codes has been triggered in the vehicle, on the basis of the relevant fault code and historical vehicle data from a database,
- determining relevant sensor measurement variables to be measured on the basis of the fault codes,
- requesting that at least the first vehicle fault state be induced,
- receiving the measured sensor measurement variables from the vehicle, -determining at least one potentially defective component.

The diagnostic device is not part of the vehicle and can e.g. be arranged outside the vehicle or in a vehicle interior, preferably temporarily for the duration of the diagnostics. The diagnostic device can comprise a vehicle diagnostic tool and/or a mobile device and/or a server or can be a vehicle diagnostic tool or a server. The diagnostic device can be a system or part of a system which comprises a vehicle diagnostic tool and a server.

The diagnostic device can establish a communication connection with the vehicle, in particular the vehicle-side controllers. To do this, the device can comprise a communication apparatus for receiving and/or transmitting data. Furthermore, the diagnostic device typically comprises a control unit, e.g. for processing data and/or controlling further units. The database can be part of the diagnostic device. Alternatively, the database can also be provided outside the diagnostic device, e.g. can be part of an external server.

At this point, it is noted that features that have only been mentioned in relation to the method can also be claimed for said diagnostic device, and vice versa. It goes without saying that the above-described embodiments can be combined with one another provided that the combinations do not exclude one another.

In the following, embodiments of the invention are explained in more detail with reference to the accompanying drawings. The drawings are schematic and sometimes simplified here. In the drawings.

Figure 1:
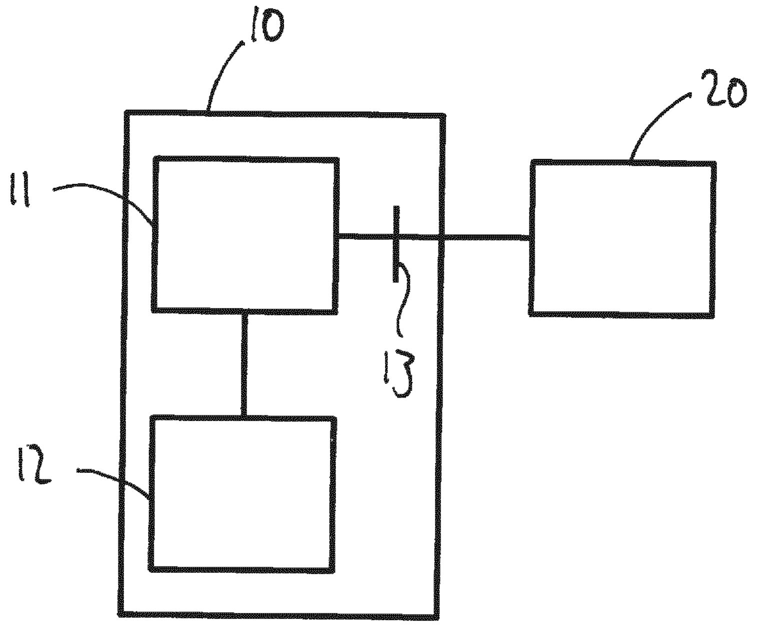
FIG. 1 is a schematic view of a vehicle diagnostic tool connected to a vehicle.

In the drawings, recurrent features are provided with the same reference signs.

The invention provides a method for performing diagnostics on a vehicle 10. The method is preferably carried out by means of a vehicle diagnostic tool 20 indicated in FIGS. 1 and 3 or a system 40 indicated FIGS. 2 and 4, the system comprising a vehicle diagnostic tool 20 and a server 30 in the exemplary embodiment in FIGS. 2 and 4.

FIG. 1 shows a vehicle 10 which comprises a plurality of controllers 11, 12, for example at least 10 or more. As indicated in FIG. 1, the controllers 11, 12 can be interconnected by a CAN bus system, for example. In addition, at least one controller 11 is connected to a vehicle diagnostic interface 13. FIG. 1 also shows a vehicle diagnostic tool 20, which typically comprises a control and processing unit, a communication unit, a memory, and an input and output unit for communication with a user, such as an automotive mechanic. The vehicle diagnostic tool 20 can usually be connected to the vehicle diagnostic interface 13 of the vehicle 10 by means of signal lines (i.e. in a wired manner).

The vehicle diagnostic tool 20 typically comprises a plug that is compatible with the vehicle diagnostic interface 13, When connecting the plug to the vehicle diagnostic interface 13, they are both electrically interconnected. In some cases, alternatively or additionally, a wireless communication connection of the vehicle diagnostic tool 20 to the vehicle 10 and the controllers 11, 12 is possible.

The controllers 11, 12 are usually each connected to a plurality of sensors which capture measurement values during operation of the vehicle 10. Conceivable sensor measurement variables include, for example, a coolant temperature, an engine temperature, a vehicle speed, an engine speed, an engine torque, an ambient temperature, an ambient air pressure, a boost pressure of an exhaust turbocharger of the drive engine, an engaged gear of a gearbox of the vehicle 10, etc. If a measurement value measured by a sensor falls below or exceeds a particular target value range, the corresponding controller 11, 12 generates a fault code. The fault code is assigned to a fault state and for example contains a code number for identifying fault functions that can occur during operation of a vehicle. The fault code is also referred to as a diagnostic fault code or a diagnostic trouble code (DTC).

The aim of the vehicle diagnostics is to be able to establish which component in the vehicle 10 is defective and how this component can be repaired. In order to be able to establish which component in the vehicle is defective, the vehicle diagnostic tool 20 (or the server 30; see below) evaluates the fault codes which are generated during operation of the vehicle 10 by evaluating the sensor measurement values by means of the at least one vehicle controller 11, 12 and are stored in a vehicle-side memory.

Following a corresponding request, the vehicle controllers 11, 12 are designed to read out the fault codes stored in the vehicle 10 and transmit them to the diagnostic tool 20 (or the server 30). The vehicle diagnostic tool 20 can therefore communicate directly with the relevant vehicle controller 11, 12 in order to obtain the required fault codes from the vehicle controller 11, 12. After this, the fault codes can be analysed by the vehicle diagnostic tool 20 in order to diagnose whether and which vehicle components need to be repaired or replaced in order to resolve the problem. Therefore, by evaluating the fault codes (vehicle diagnostics), a conclusion can be drawn as to which vehicle components are defective and need repairing.

Instead of referring to individual components 11, 12, 13 of the vehicle 10 or the diagnostic tool 20, for the sake of simplicity, reference is made in the following to the vehicle 10 and the vehicle diagnostic tool 20.

Figure 3:
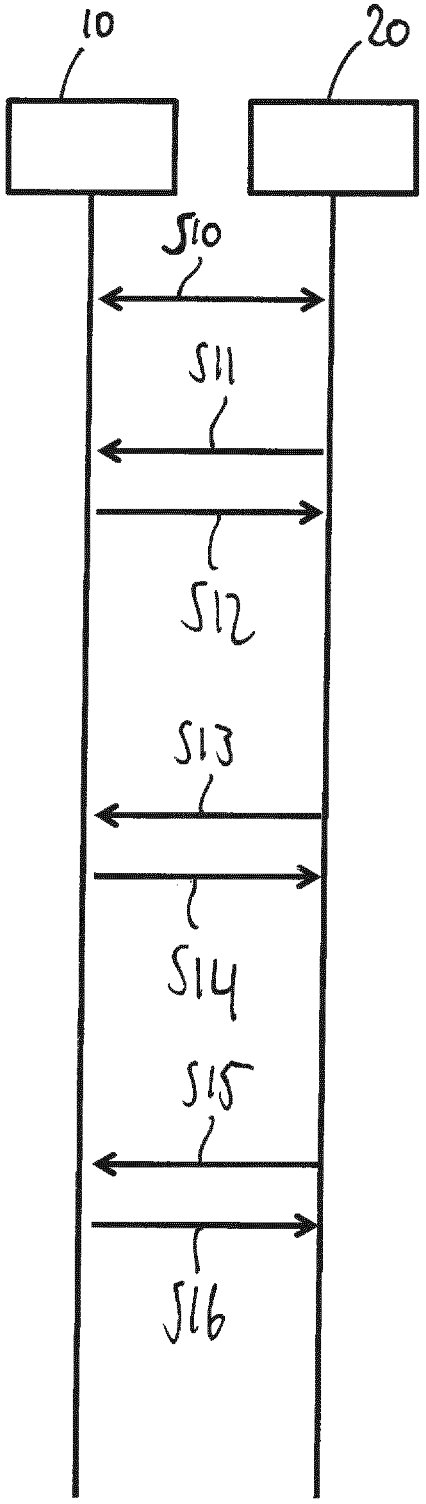
FIG. 3 is a schematic view of a communication sequence between a vehicle and a vehicle diagnostic tool.
Figure 4:
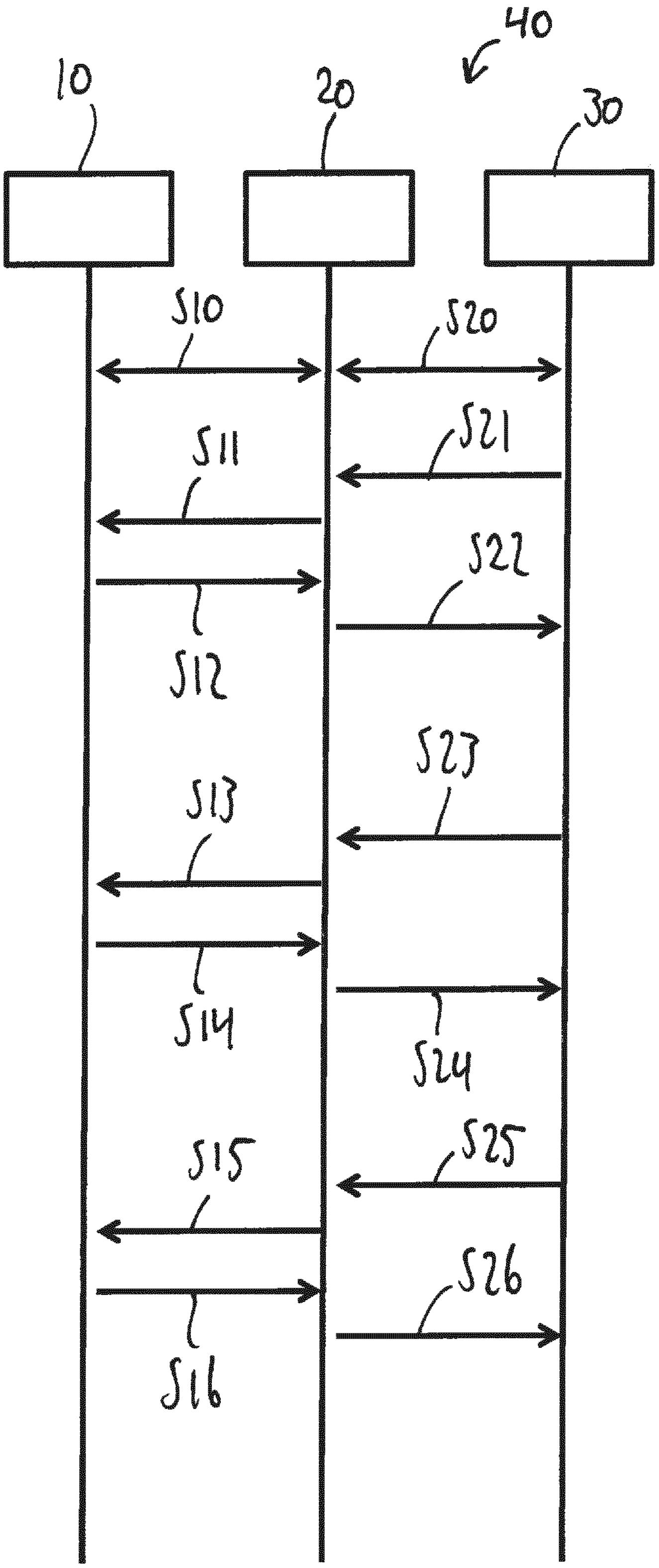
FIG. 4 is a schematic view of a further communication sequence between a vehicle and a system.

FIG. 3 schematically shows a preferred communication sequence between the vehicle 10 and the vehicle diagnostic tool 20. In this figure, the transmitting and receiving steps are each combined in one arrow having a reference sign.

After connecting the plug of the diagnostic tool 20 to the vehicle diagnostic interface 13, a communication connection is established between the vehicle diagnostic tool 20 and the vehicle 10 (S10).

Usually, it is necessary for the vehicle to be identified so that the vehicle diagnostic tool 20 can assign the fault codes to a particular vehicle 10, in particular manufacturer, type, and equipment of the vehicle 10. The vehicle diagnostic tool 20 therefore sends (S11) a request for identification of the vehicle 10 to the vehicle. The vehicle 10 then transmits (S12) at least one vehicle identification means of the vehicle 10, which can be stored in a vehicle-side memory, to the vehicle diagnostic tool 12. In alternative embodiments, the manufacturer, type, and/or equipment of the vehicle 10 or the vehicle identification means are input into the vehicle diagnostic tool 12 manually by a technician or vehicle mechanic.

After this, the vehicle diagnostic tool 20 can request (S13) the fault codes from the vehicle 10, for example. The vehicle 10 then transmits the requested fault codes to the vehicle diagnostic tool 20 and the vehicle diagnostic tool 20 receives (S14) the vehicle fault codes. After they are received, the fault codes can be analysed or evaluated by the vehicle diagnostic tool 12.

For more accurate diagnostics, the vehicle diagnostic tool 20 can additionally request from the vehicle 10 up-to-date measured sensor measurement values or sensor measurement values stored in the vehicle. This is carried out by a corresponding request (S15), for example. The vehicle controller 11, 12 retrieves the requested sensor measurement values from a vehicle-side memory, for example, or activates corresponding vehicle sensors to return or capture the sensor measurement values. The sensor measurement values are then sent (S16) from the vehicle controller 11, 12 to the vehicle diagnostic tool 20 for further evaluation or processing. On the basis of the fault codes and the sensor measurement values, the vehicle diagnostic tool 20 can establish which component in the vehicle is defective and needs repairing.

At this point, it should be noted that certain transmitting and receiving steps can be combined. For instance, steps and S13 and steps S12 and S14 can each be combined, for example.

Furthermore, the vehicle diagnostic tool 20 can send commands to the vehicle controller 11, 12. For example, a command sent to the vehicle controller includes a setting of the sensor or changing the setting of the sensor, with the setting e.g. including the sensitivity of the sensor, the frequency of the measurements, and/or a time sequence of the measurements.

Additionally or alternatively, the status of the vehicle controller 11, 12 can be changed or set by the vehicle diagnostic tool 20 via a corresponding message.

In this context, the servicing interval, actuation of final control elements, or the like would be conceivable, for example. The sequence of the vehicle diagnostics will be described below.

Figure 2:
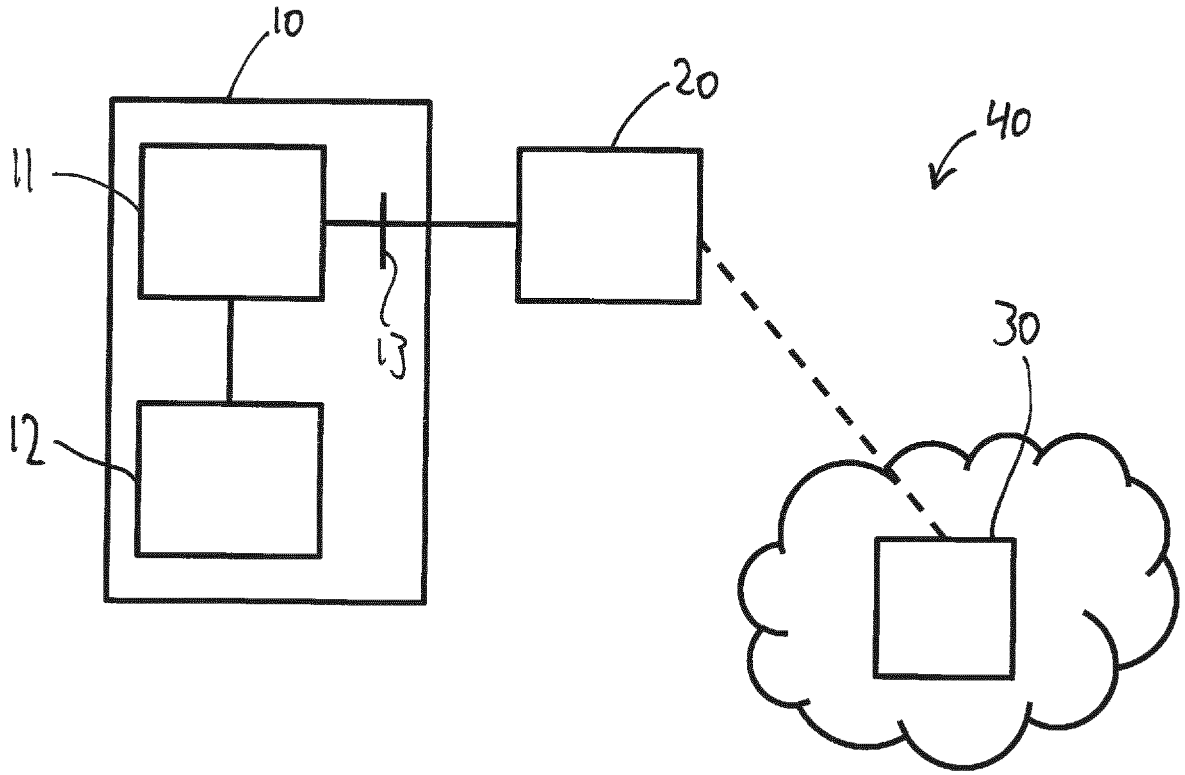
FIG. 2 is a schematic view of a system for performing vehicle diagnostics.

The vehicle diagnostics can alternatively also be performed using the system 40 shown in FIG. 2. The system 40 comprises the above-described vehicle diagnostic tool 20 and a server 30. As explained above, the vehicle diagnostic tool 20 is preferably connected to the vehicle 10 via the vehicle interface 13. The vehicle diagnostic tool 20 is also connected to an external server 30 wirelessly or in a wired manner. As a result, communication between the server 30 and the diagnostic tool 20 is possible. In the following, the communication between the vehicle 10, the diagnostic tool 20, and the server will be discussed.

First, a communication connection is established (S10) between the vehicle diagnostic tool 20 and the vehicle 10. Then (or before this or simultaneously), a communication connection is established (S20) between the vehicle diagnostic tool 20 and the server 30. The diagnostic tool 20 is now capable of providing communication between the server 30 and the vehicle 10. The diagnostic tool 20 can thus convey data or messages between the vehicle 10 and the server 30.

Usually, it is necessary for the vehicle 10 to be identified so that the server 30 can assign the fault codes to a particular manufacturer and vehicle type. The server 30 therefore sends (S21) a request for identification of the vehicle 10 to the diagnostic tool 20, which relays (S11) the request to the vehicle 10. The vehicle 10 then transmits (S12) at least one identification means of the vehicle 10, which can be stored in a vehicle-side memory, via the diagnostic tool 20 to the server 30 (S22).

After this, the server 30 can request fault codes from the vehicle 10, for example. The diagnostic tool 20 relays the request from the server 30 to the vehicle controller 10 (S23, S13), for example. The vehicle 10 then transmits (S14) the requested fault codes to the diagnostic tool 20, which sends (S24) the fault codes to the server 30. After they are received, the fault codes can be analysed or evaluated by the server 30.

For more accurate diagnostics, the server 30 can additionally request from the vehicle 10 sensor measurement values. This is carried out by a request, for example, which is relayed (S25, S15) from the diagnostic tool 20 to the vehicle 10. The vehicle 10 retrieves the requested sensor measurement values from the vehicle-side memory or activates corresponding vehicle sensors to return or capture the sensor measurement values. The sensor measurement values are then sent (S16) from the vehicle 10 to the diagnostic tool 20 and sent (S26) from the diagnostic tool 20 to the server 30 for further evaluation or processing. On the basis of the fault codes, the identification means, and the sensor measurement values, the server 30 can establish which component in the vehicle 10 is defective and needs repairing.

At this point, it should be noted that certain transmitting and receiving steps can be combined. For instance, steps S21 and S23, steps S11 and S13, steps S12 and S14, and steps S22 and S24, can each be combined, for example.

Furthermore, the server 30 can send commands to the vehicle 10 via the diagnostic tool 20. For example, a command sent to the vehicle includes a setting of the sensor or changing the setting of the sensor, with the setting e.g. including the sensitivity of the sensor, the frequency of the measurements, and/or a time sequence of the measurements.

Additionally or alternatively, the status of the vehicle 10 can be changed or set by the server 30 via a corresponding message. In this context, the servicing interval, actuation of final control elements, or the like would be conceivable, for example.

The vehicle 10 can also receive new software components or updates, which the server 30 sends to the vehicle 10 via the diagnostic tool 20.

It goes without saying that the features and steps described above and shown in FIGS. 1 and 2, and 3 and 4, can be combined with one another provided that the combinations do not exclude one another. Features and steps that have only been mentioned in relation to the diagnostic tool 20 can also be claimed for the server 30 and the system 40, and vice versa.

In the system 40, instead of the vehicle diagnostic tool 20 shown, a mobile device, such as a mobile phone, a laptop, a computer, a tablet, or the like, can alternatively be provided, which is connected both to the vehicle 10, in particular via the vehicle interface 13, and to the server 30 and which provides the communication between the vehicle 10 and the server 30. The mobile device thus preferably relays messages, such as commands and/or requests, or data, such as measurement values and/or DICs, from the vehicle 10 to the server 30, and vice versa.

In the following, the actual vehicle diagnostics which can in particular be performed by the vehicle diagnostic tool 20, the server 30, or the system 40 will be discussed in greater detail.

First, automated vehicle identification is typically carried out. For the vehicle identification, at least the already above-mentioned vehicle identification means is used, which can in particular include a vehicle identification number (VIN) and/or an engine code and/or a controller identification number and/or a code designation. The vehicle identification means is compared with known vehicle means from the database in order to identify the vehicle 10. In some cases, the VIN is not sufficient for unequivocally Identifying the vehicle 10. In these cases, on the basis of manually selected vehicles with the VIN present in the database, patterns are extracted that can also be used for unknown VINs. By incorporating the engine code and the code designation, vehicles can be identified for which the VINs alone were insufficient in a cross-manufacturer manner.

The following step is then carried out:

receiving S14, S24 a plurality of fault codes from the vehicle 10.

The method further comprises the following steps:

determining at least one first vehicle fault state, the vehicle fault state constituting a state of the vehicle 10 in which at least one of the fault codes has been triggered in the vehicle 10, on the basis of the relevant fault code and historical vehicle data from a database outside the vehicle 10, determining relevant sensor measurement variables to be measured on the basis of the fault codes, requesting that at least the first vehicle fault state be induced, preferably by displaying a request on a display of the diagnostic tool 20, and receiving S16, S26 the measured sensor measurement variables from the vehicle 10.

A vehicle state is thus determined which the mechanic and/or the vehicle 10 is supposed to induce in order to be able to measure high-quality sensor measurement values (for example, speed increase in idle, test drive, activating air-conditioning system). To do this, the historical vehicle data from the database are preferably consulted, the database being stored in a memory medium which is part of the diagnostic tool 20, the server 30, or a further server, for example. The historical vehicle data include at least the vehicle manufacturer, vehicle type, vehicle equipment, fault codes, mileage, vehicle age, sensor measurement values, and/or sensor measurement variables.

Typically, on the basis of the historical data, a check is carried out as to what the vehicle state was previously under the fault code (e.g. on the basis of the speed or engine speed) or whether an actuator test/final-control-element test of components was carried out (e.g. activating demister or air-conditioning system), Furthermore, for example, on the basis of historical data a check can be carried out as to which sensor measurement variables (sensor parameters) are selected more frequently by users when a corresponding fault code is present. By inducing the first vehicle fault state, relevant measurement values can therefore be captured, which can then be used for the diagnostics.

For example, the vehicle state can be induced by changing or setting at least one final control element (actuator), changing or setting at least one vehicle parameter, switching at least one vehicle module on or off, and/or switching at least one vehicle controller on or off. Once the vehicle has been put into the vehicle fault state, a corresponding confirmation can be sent to the vehicle diagnostic tool 20 or the server 30.

If necessary, depending on the fault code, a plurality of vehicle fault states, in each of which relevant sensor measurement variables to be measured are measured, are induced in succession.

In order to increase the accuracy, a relevance of the fault code in question can be determined. The fault codes are then sorted and weighted by relevance. For example, only the most relevant fault codes are taken into consideration for the diagnostics. Less relevant fault codes can be left out of consideration. If, for example, an average time interval between triggering and deleting the fault code exceeds a predetermined duration, the fault can be classified as not being relevant. On the other hand, the fault can be classified as relevant if the average time interval between triggering and deleting the fault code falls below a predetermined duration.

Alternatively or additionally, the fault codes can be classified by vehicle assembly and/or customer group and/or correlating historical fault codes by comparison with historical fault codes from the database. In this case, correlating fault codes are fault codes that occur more frequently on average when the fault code occurs. When the fault code is assigned to a particular vehicle assembly, the correlating fault codes can likewise be assigned to this vehicle assembly. The relevance of the fault code in question can then be determined on the basis of the classification of the fault code.

In addition, the method comprises the following step:

determining at least one potentially defective component in the vehicle 10, in particular on the basis of the fault codes, the measured sensor measurement values, and the mileage of the vehicle.

Preferably, retrievals of technical information, such as repair information or vehicle component information, by the mechanic on the diagnostic tool 20 are stored in a record, which is also called logging. The logging data are preferably also stored in the database. The logging data can be taken into consideration when determining the potentially defective component.

If a mechanic reads out a fault code or measurement values, for example, relevant information that is needed for the repair is then usually selected on the diagnostic tool 20 on the basis of their expert automotive knowledge. Up to 18 different menus with further sub-menus are often available to the mechanic in the diagnostic tool 20, for example circuit diagrams, operate values, or component test values. In conventional solutions, the mechanic had to make an appropriate selection in each menu. Once the menus are selected and the content is displayed, the corresponding menus (path to the content) are stored in the database (e.g. on the server 30 and/or the diagnostic tool 20). On the basis of the menus and the content, relevant components or component formations are extracted, for example from a memory of the diagnostic tool 20 or the database.

According to a development, the at least one potentially defective component is additionally determined on the basis of service data and/or billing data at garages and/or on the basis of accessing repair information in the database.

In a further variant, the method can comprise the following step: determining context-based repair information on the basis of the fault codes and/or the sensor measurement variables and/or the potentially defective components. Context-based repair information for example includes circuit diagrams, operate values, or component test values which the user needs for repairing the vehicle or resolving the fault. The context-based repair information can be determined by means of the historical logging data.

In addition, the relevance of the fault codes can be determined, for example on the basis of identical historical fault codes. If, for example, the fault codes remain set for a relatively long period of time, this is an indication that the fault code is less relevant. Historical fault codes from customer groups which focus on the repair of less critical problems (e.g. "glazing") can also be used for classifying the relevance. If fault codes are read out therefrom that are outside this focus (e.g. fault codes generated on the basis of engine sensor measurement values), this is also an indication that the fault code is less relevant. The cause of the customer's concern is, specifically, a different problem.

Predictive models can be developed on the basis of the historical vehicle data (relevant fault codes, sensor measurement values, and mileages) in connection with the extracted components.

Anomalies in the sensor measurement values can also be determined. A self-learning system (diagnostic tool 20, server 30, or system 40) is intended to identify correlating sensor measurement values and coherent sensor measurement variables and to form a main cluster (majority of all healthy measuring points) therefrom, on which the outlier models can be trained. Fault codes can additionally be incorporated for identifying the main cluster. This means that, in the measurement values in the main cluster, preferably no fault codes are set or a number of fault codes is set that does not exceed a predetermined limit. These models can be applied to current sensor measurements and a probability of whether the measurement should be classified as an outlier/anomaly is calculated. Measurement values within a target range are accordingly evaluated as being positive, while measurement values outside the target range are evaluated as being negative. Correlating and/or coherent sensor measurement variables can be taken into consideration for determining the target range. The measured sensor measurement variables can be compared with the respective target ranges for identifying outliers in the sensor measurement variables. For example, the degree of deviation of the measurement value from the target range can be stated, for example by being displayed on the display of the diagnostic tool 20. These models make it possible to visualise/display the current measurement value together with a target measurement value, including its tolerance range (target range). This allows the results to be comprehensible and the mechanic can better assess how the results have come about.

Optionally, the method comprises at least one of the following steps:

creating and displaying a list of potentially defective components, creating and displaying context-based component information for the defective components, and/or creating and displaying required repair steps.

It goes without saying that the embodiments described above and shown in the drawings can be combined with one another provided that the combinations do not exclude one another. Features that have only been mentioned in relation to the vehicle diagnostic tool 20 and/or the server 30 can also be claimed for the system 40 or the method, and vice versa.

LIST OF REFERENCE SIGNS

10 Vehicle
11 Vehicle controller
12 Vehicle controller
13 Diagnostic interface
14 Vehicle diagnostic tool
30 Server
40 System

The invention claimed is:

1. A method for performing vehicle diagnostics, the method comprising:

receiving a plurality of fault codes from a vehicle;

determining at least one first vehicle fault state, wherein the at least one first vehicle fault state corresponds to a state of the vehicle in which at least one fault code of the plurality of the fault codes has been triggered in the vehicle based on at least one of the at least one fault code or the historical vehicle data from the database;

determining one or more relevant sensor measurement variables to be measured based on the at least one fault code;

adjusting at least one vehicle parameter to induce the first vehicle fault state;

receiving the measured one or more sensor measurement variables from the vehicle while the vehicle is in the induced fault state; and determining whether at least one component is potentially defective based on the measured one or more sensor measurement variables received from the vehicle while the vehicle is in the induced fault state.

2. The method according to claim 1, wherein adjusting at least one vehicle parameter includes at least one of:

at least one of changing, activating, or setting at least one final control element;

activating a vehicle function;

at least one of changing or setting the at least one vehicle parameter; or activating or deactivating at least one vehicle module.

3. The method according to claim 1, comprising:

determining a relevance of the at least one fault code.

4. The method according to claim 1, wherein historical logging data from diagnostic tools are used for determining the at least one potentially defective component.

5. The method according to claim 4, wherein the historical logging data includes at least one of retrieved repair information or retrieved vehicle component information.

6. The method according to claim 1, wherein a target range is determined by comprising historical vehicle data corresponding to a particular sensor measurement variable of the one or more sensor measurement variables with every other sensor measurement variable of the one or more relevant sensor measurement variables, and wherein the target range includes at least one of a target measurement value or a tolerance range for the particular target measurement value.

7. The method according to claim 6, wherein the target range is further determined by correlating at least one of one or more sensor measurement variables or one or more coherent sensor measurement variables.

8. The method according to claim 6, comprising:

comparing the measured sensor measurement variables with the respective target ranges to identify an outlier in the sensor measurement variables; and displaying the comparison on a user interface.

9. The method according to claim 1, comprising:

receiving at least one vehicle identification, the vehicle identification including at least one of a vehicle identification number, an engine code, a controller identification number, or a code designation;

comparing the vehicle identification with a vehicle identification from the database; and identifying the vehicle to be diagnosed based on the comparison.

10. The method according to claim 9, wherein the historical vehicle data includes at least one of the vehicle identification, a vehicle manufacturer, a vehicle type, a vehicle equipment, historical fault codes, a vehicle mileage, a vehicle age, one or more sensor measurement values, or the one or more sensor measurement variables.

11. The method according to claim 1, comprising:

determining context-based repair information based on at least one of the at least one fault code of the plurality fault codes, the one or more sensor measurement variables, or the potentially defective components.

12. The method according to claim 1, wherein the at least one potentially defective component is additionally determined based on at least one of service data from a vehicle repair facility, billing data from the vehicle repair facility, or accessing repair information in the database.

13. The method according to claim 1, wherein the at least one fault code from the plurality of fault codes is evaluated based on the one or more measured sensor measurement variables, and wherein the at least one potentially defective component is determined based on the at least one fault code of the plurality of fault codes and the measured sensor measurement variables.

14. The method according to claim 3, wherein the relevance of the at least one fault code is determined on the basis of an average time interval between triggering and deleting identical historical fault codes.

15. The method according to claim 14, wherein the relevance is deemed to be high when the average time interval falls below a first predetermined value, and wherein the relevance is deemed to be low when the average time interval exceeds a second predetermined value.

16. The method according to claim 3, wherein the plurality of fault codes are classified by at least one of a vehicle assembly, a customer group, or correlating one or more historical fault codes by comparison with a set of historical fault codes from the database, and wherein the relevance of the at least one fault code is determined based on the classification of the at least one fault code.

17. The method according to claim 1, wherein determining the at least one first vehicle fault state includes generating a predictive model from historical vehicle data from a plurality of vehicles in a database, wherein the predictive model correlates one or more fault codes with one or more vehicle states.

18. A diagnostic device comprising:

a vehicle diagnostic tool; and a server;

wherein the vehicle diagnostic tool is configurable to:

receive a fault code from a vehicle using the diagnostic tool;

determine a vehicle fault state based on the received fault code;

determine a sensor measurement variable to be measured based on the fault code;

cause a measurement of the sensor measurement variable;

adjust at least one vehicle parameter to induce the vehicle fault state;

receive the measured sensor measurement variable from the vehicle while the vehicle is in the induced fault state; and determine at least one potentially defective component based on the sensor measurement variable received from the vehicle while the vehicle is in the induced fault state.

19. The diagnostic device of claim 18, wherein to request the vehicle fault state be induced includes at least one of: at least one of changing, activating, or setting a final control element, activating a vehicle function, at least one of setting or changing a vehicle parameter, or activating or deactivating at least one vehicle module.

20. The diagnostic device of claim 18, wherein the diagnostic device is configurable to:

determine a relevance of the fault code, wherein the relevance of the fault code is determined based on at least one of an average time interval between a triggering and a deleting of like historical fault codes or a classification of the fault code.

21. The diagnostic device of claim 18, wherein the at least one potentially defective component is determined based at least in part on historical logging data stored in a database coupled at least one of the diagnostic device, the vehicle diagnostic tool, or the server.

* * * * *